Aug. 24, 1965     D. F. CHRISTY     3,201,874
SELF-POSITIONING STUD SPACING GAUGE
Filed June 22, 1962
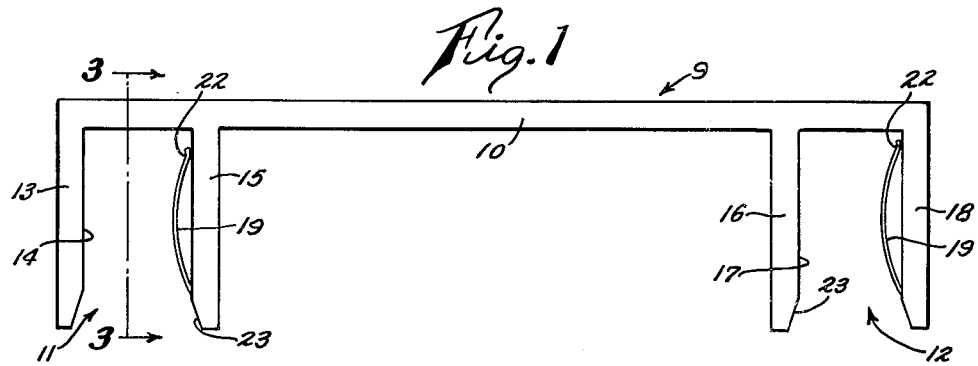
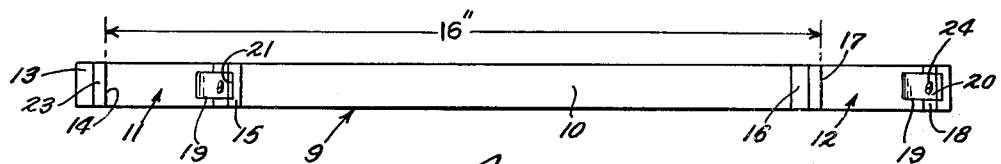
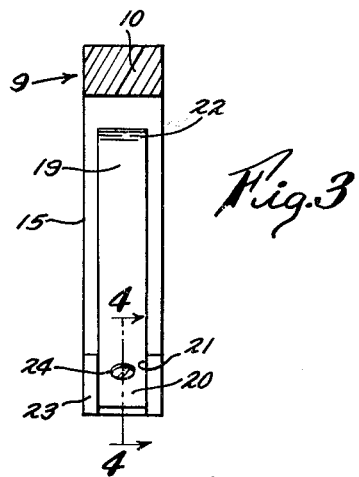
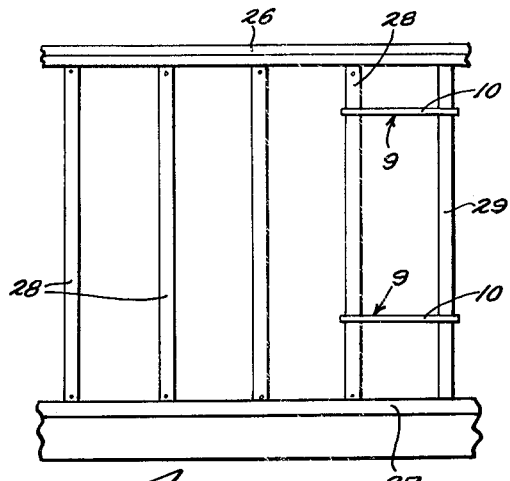
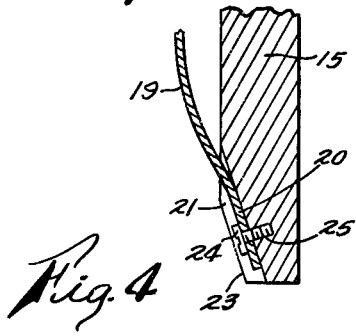
INVENTOR.
Donald F. Christy
BY
ATTY.

United States Patent Office 3,201,874
Patented Aug. 24, 1965

3,201,874
SELF-POSITIONING STUD SPACING GAUGE
Donald F. Christy, 519 Congress St., Ottawa, Ill.
Filed June 22, 1962, Ser. No. 204,509
2 Claims. (Cl. 33—180)

The present invention relates to an improved gauge for accurately spacing and positioning structural members, such as studs, rafters and joists, for placement in a building and the main object of the invention is to provide a spacing instrument that is self-positioning on adjacent structural members during use thereby freeing the user's hands to set or nail a member in position in the building.

Another object of the invention is to provide a rugged, yet simplified spacing instrument that has a pair of fixed jaws which require no cumbersome or time consuming adjustments in use and which compensates for variations in the thicknesses of the structural elements whilst automatically centering said members for accurate placement in the building structure.

Further objects of the invention are to provide a light weight instrument that is easily transported and handled, is extremely simple to use and to secure a practical and accurate device that can be used equally well by amateurs and professional people alike.

Other objects and advantages of my invention will become apparent from the following specification taken in conjunction with the accompanying drawing, wherein:

FIG. 1 is a side elevational view of my spacing gauge.

FIG. 2 is a bottom plan view of the gauge as it is shown in FIG. 1.

FIG. 3 is an enlarged section taken on line 3—3 of FIG. 1.

FIG. 4 is a section taken on line 4—4 of FIG. 3.

FIG. 5 is a fragmental, side elevational view of a building structure showing an exemplary use of the gauge shown in FIGS. 1-4 of the drawing.

With reference to the drawings wherein like reference numerals indicate identical parts thoughout the several views my self-positioning stud spacing gauge or instrument 9 is cast in one piece preferably from a light weight metal and comprises a longitudinally extending, straight bar 10 that has a pair of jaws 11 and 12 each projecting in the same lateral direction from an end of the bar. As depicted in FIGS. 1 and 2 the jaw 11 consists of a first rigid arm 13 fixed integrally on one terminal end of the straight bar 10 and which has a planar, interior face 14 whcih is positioned normal to the longitudinal center line of the bar 10. Jaw 11 also has a second rigid arm 15 integral on the bar and spaced longitudinally inwardly from and parallel to the arm 13. The interior, confronting faces of the arms 13 and 15 are spaced apart a distance somewhat greater than the maximum thickness in which building structural members are produced and supplied to the market. For example building members such as the standard 2 x 4's vary in thickness from 1⅜" to 1⅞" and in rare cases actually measure 2" x 4" and it is therefore now thought preferable to maintain a spacing between the interior faces of the arms 13 and 15 of my instrument of about 2" to accommodate substantially all variations in thicknesses of this particular standard building member.

Jaw 12 is identical in all respects to jaw 11, the former having an integral rigid first arm 16 provided with a planar face 17 that is normal to the center line of the bar, said jaw being completed by a second rigid arm 18 that extends from the remaining terminal end of the bar and which is preferably parallel to the arm 16. The interior confronting faces of the arms 16 and 18 are also approximately 2" apart for the same reason as this spacing is maintained between arms 13 and 15 of jaw 11.

As depicted in FIG. 2 the distance between the planar faces 14 and 17 on the first arms 13 and 16 of jaws 11 and 12, respectively, is 16", said faces being parallel to each other for the reason that each is normal to the longitudinal center line of the straight bar 10. Building structural members such as studs, rafters and joists are conventionally spaced apart in the building structure a distance of 16" from center to center of adjacent members and such spacing is built into my spacing instrument by maintaining that distance between the planar faces 14 and 17 of the jaws 11 and 12, respectively.

The second rigid arms 15 and 18 of the jaws 11 and 12, respectively, each have an expansible spring means mounted on the interior face thereof which confronts the planar face of the first arms 13 and 16, respectively, said spring means being operable toward the planar faces 14 and 17 on said first arms. These spring means are identical for each jaw and in each instance preferably comprises a bow-shaped, relatively heavy leaf spring 19 anchored at its outer end 20 in a slot 21 formed or cast in the confronting face of the second arm, while the inner free end of the spring is curved outwardly at 22 to slide freely on the inner portion of said confronting face. The confronting, free end portions of the arms of each jaw are tapered inwardly, as at 23, to provide ready alignment and insertion of a structural member into each jaw. A screw 24, countersunk and threaded in a tapped bore 25 in the tapered portion 23 of the arms 15 and 18 is provided to anchor each of the leaf springs in operative position on its respective arm. Thus the instrument has two longitudinally spaced apart jaws, each jaw consisting of the first rigid arm that has a planar face normal to the longitudinal center of the bar and a second rigid arm spaced from the planar face of the first arm, the second rigid arm having a spring means mounted thereon, that is biased toward the said first planar face of the rigid arm.

With particular reference to FIG. 5, illustrative of a conventional building structure, the numerals 26 and 27 indicate horizontal members that are part of a building structure whilst the numeral 28 indicates studs which have been nailed and set between the said base members. The reference numeral 29 indicates a stud that is to be placed in the structure and this is done with the aid of a pair of my instruments 9—9, it being understood that one jaw 11 of each pair is forced onto the set stud 28 whilst the stud 29 to be placed in the structure is forced into the remaining jaw 12 of each pair. The springs 19 are biased so as to self position the gauges in their illustrated operative positions so that the user may have both hands free to place or nail the stud 29 in the building structure. It will be also noted that the springs 19—19 on the second arms will urge the studs in each jaw toward the planar positioning faces 14 and 17, on the first arms thereby automatically spacing the fixed stud from the stud to be placed in the structure a distance of approximately 16" from center to center of said studs, the error from center to center between the adjacent studs being so small as to be only half the total variation of thicknesses of said adjacent studs which is insignificant for all practical purposes. Any such variation would not be compounded in the building as corresponding faces on all the members would be spaced 16" apart in the row of studs positioned by my instrument.

Having thus described my invention what I claim is:

1. In a self-positioning spacing gauge for structural building members the combination of a longitudinally extending bar, a jaw mounted on each end portion of the bar and projecting from a common side thereof, each jaw having a first rigid arm provided with a planar, interior face normal to the center line of the bar and a second rigid arm spaced longitudinally from the first arm and having an interior face confronting the planar face of the first arm, the second rigid arms being located on corresponding sides of the first rigid arms and the confronting faces on said first and second rigid arms being longitudinally spaced apart a distance greater than the maximum thickness of the structural building members, and a longitudinally expansile spring means mounted on the confronting face of the second arm, said planar faces on the first and second arms being disposed in parallel relationship and spaced apart a predetermined longitudinal distance on the bar.

2. In a gauge as set forth in claim 1 characterized by the fact that the spring means of each jaw is a bowed, leaf spring anchored in the free end of the said arm and having the free end of the spring slidable on the inner portion of the confronting face of the second arm.

References Cited by the Examiner
UNITED STATES PATENTS

| | | | |
|---|---|---|---|
| 712,140 | 10/02 | Keeley | 24—10.1 |
| 2,567,586 | 9/51 | Werder | 33—194 |
| 2,686,959 | 8/54 | Robinson | 269—43 X |
| 2,693,160 | 11/54 | Gauthier | 269—254 X |
| 2,744,334 | 5/56 | Jondole | 33—180 |

ISAAC LISANN, *Primary Examiner.*